(12) United States Patent
Mahlab et al.

(10) Patent No.: US 8,837,935 B2
(45) Date of Patent: Sep. 16, 2014

(54) TECHNIQUE FOR MONITORING OPTICAL NETWORKS

(75) Inventors: Uri Mahlab, Or Yehuda (IL); Mordechay Tuby, Petach-Tikva (IL)

(73) Assignee: ECI Telecom Ltd., Petach-Tikva (IL)

( * ) Notice: Subject to any disclaimer, the term of this patent is extended or adjusted under 35 U.S.C. 154(b) by 110 days.

(21) Appl. No.: 13/518,792

(22) PCT Filed: Dec. 16, 2010

(86) PCT No.: PCT/IL2010/001064
§ 371 (c)(1), (2), (4) Date: Jun. 22, 2012

(87) PCT Pub. No.: WO2011/077429
PCT Pub. Date: Jun. 30, 2011

(65) Prior Publication Data
US 2012/0263457 A1      Oct. 18, 2012

(30) Foreign Application Priority Data

Dec. 24, 2009   (IL) .......................................... 202935

(51) Int. Cl.
*H04B 10/08* (2006.01)
*H04B 17/00* (2006.01)
*H04B 10/079* (2013.01)

(52) U.S. Cl.
CPC ................. *H04B 10/0795* (2013.01)
USPC .............................................. 398/25; 398/26

(58) Field of Classification Search
CPC combination set(s) only.
See application file for complete search history.

(56) References Cited

U.S. PATENT DOCUMENTS

| | | | |
|---|---|---|---|
| 6,580,763 B1 | 6/2003 | Müllner et al. | |
| 7,269,347 B1 | 9/2007 | Matricardi et al. | |
| 2003/0016695 A1 | 1/2003 | Sabet et al. | |
| 2009/0269076 A1 | 10/2009 | Cai et al. | |
| 2010/0178059 A1* | 7/2010 | Shou et al. ................... | 398/136 |

OTHER PUBLICATIONS

Aubin et al.: "Soliton transmission at 10 Gbit/s with a 70 km amplifier span over one million kilometers" Electronics Letters, vol. 30, No. 14, Jul. 7, 1994; pp. 1163-1165.
International Search Report mailed Mar. 28, 2011, in International Application PCT/IL2010/001064 filed Dec. 16, 2010.
Written Opinion for PCT/IL2010/001064 mailed Mar. 28, 2011.

* cited by examiner

*Primary Examiner* — M. R. Sedighian
*Assistant Examiner* — Mina Shalaby
(74) *Attorney, Agent, or Firm* — Novick, Kim & Lee, PLLC; Harold L. Novick; Jae Youn Kim

(57) ABSTRACT

A technique for monitoring at least a network portion of an optical communication network, by monitoring changes of a decision threshold used for discriminating a digital optical signal being propagated via the network portion.

12 Claims, 3 Drawing Sheets

TECHNIQUE FOR MONITORING OPTICAL NETWORKS

CROSS-REFERENCE TO RELATED APPLICATIONS

This Application is the National Phase of International Patent Application No. PCT/IL2010/001064 filed Dec. 16, 2010 and designating the United States, which claims priority to Israel Patent Application No. IL 202935, filed Dec. 24, 2009.

FIELD OF THE INVENTION

The present invention relates to a technology for monitoring an optical network and in particular—for management of the optical network, based on the monitoring results.

BACKGROUND OF THE INVENTION

Management of an optical network is usually performed based on monitoring various specific parameters of the network operation.

For example, US2003016695A describes a method and apparatus for maintaining an established error count for data transmitted on a WDM optical communication network. Error counts from an FEC code are monitored and operational parameters are automatically adjusted in response to the error counts, thereby achieving system optimization in an automated manner.

Digital communication is based on distinguishing different levels of optical or electrical signals; owing to that, proper selection of a decision threshold is very important for operation of a network. Usually, it is a binary decision threshold for On-Off Keying modulation format, but the problem is actual also for multiple level decision thresholds of M-ary modulation formats. A number of sources in the prior art propose performing adaptation of binary threshold's decision level in optical network elements, mainly in receivers.

U.S. Pat. No. 7,269,347 B describes a method of controlling an optical signal receiver that utilizes three control loops: a first control loop tunes the decision threshold of the receiver when the optical network is in a substantially steady state and a second control loop rapidly switches to a reference decision threshold upon the occurrence of an alarm condition. The invention rapidly switches to a predetermined reference decision threshold to compensate for optical signal changes in eye diagram and received power after a protection switch or traffic reroute. After a protection switch, a slower tuning algorithm is used to adjust the decision threshold to a more optimum value. In the third control loop, the optical signal receiver may utilize a peak detector that detects the optical signal peak and a potentiometer that is commanded by a controller to output a commanded percentage of this peak value to adjust the threshold and to thereby respond to transients.

Prior art comprises some discussions about arranging feedback from the changing threshold itself.

For example, U.S. Pat. No. 6,580,763 describes controlling the decision threshold and the sampling instant of a data regenerator wherein the data regenerator includes a second data path whose decision threshold can be shifted. By comparing the output data, it is possible to calculate the bit errors which are caused by a shifting of the decision threshold. By experimentally shifting the sampling instant and subsequently the decision threshold the optimal sampling instant and the optimal decision threshold are found.

US 20090269076 describes systems and methods for a receiver threshold optimization loop to provide self-contained automatic adjustment in a compact module, such as a pluggable optical transceiver. The receiver threshold optimization loop utilizes a performance metric associated with the receiver, such as FEC, to optimize performance of the receiver. The receiver is optimized through a change in the receiver threshold responsive to the performance metric. Further, US 20090269076 provides improved receiver performance through a continuous adjustment that is self-contained within the receiver, such as within a pluggable optical transceiver compliant to a multi-source agreement (MSA). The receiver threshold optimization loop can include a fine and a coarse sweep of adjustment from an initial setting.

SUMMARY OF THE INVENTION

The Inventors have noticed that numerous prior art sources disclose using various parameters as criteria for adaptation of a decision threshold. In other words, the decision threshold is known to be regulated/adapted/controlled based on many different parameters, and also based on a group of various parameters. The Inventors have further and surprisingly noticed, that none of the prior art sources discusses utilizing the very fact of the changing threshold (for discriminating a binary or an M-ary optical signal) or the nature of the threshold changes for monitoring behavior of an optical network and/or for managing the network where the signal is propagated.

Therefore, according to a first aspect of the invention, there is proposed a method for monitoring at least a portion of an optical communication network, comprising
performing adaptation/control of a decision threshold in at least one optical network element, at least at one optical channel of said network, wherein the control is based on at least one criterion;
monitoring changes of said decision threshold (being controlled);
judging about network behavior based on results of the monitoring (results concerning decision threshold changes).

The network portion may be, for example, just an optical communication line carrying at least one optical channel.

In one preferred version of the method, the method may further comprise a step of managing the network by utilizing results of the judgment based on said monitoring.

The changes of said decision threshold may be monitored by obtaining samples of behavior of the threshold under adaptation—say, in the form of time diagrams of the threshold value (say, in voltage, current, power units) and, optionally, by storing such samples of behavior in a data base of obtained samples.

According to one version, the method comprises a preliminary step of forming a data base for typical behavior samples, wherein each of the typical behavior samples may be presented, for example as a shape of time diagram of threshold voltage (power) being typical for a particular problem in said network.

In case such a data base of typical behavior samples is formed (which can be done in one or another manner and will partially be discussed in the frame of the present application), the method may further comprise comparing a specific behavior sample, obtained during the monitoring, with all typical samples stored in the data base of typical shapes. Based on the comparison, and based on a possibly determined match with one or more of the typical samples, the mentioned judgment can be performed.

Alternatively, or in addition to storing in the data base the mentioned typical samples in the form of time diagrams, other typical samples may be stored. For example, another type of a threshold signal typical behavior sample may be presented just by a typical feature in the electrical signal ("threshold signal") of the threshold value under adaptation in one or more optical channels, for example:

- a spectral feature, say, presence of specific frequencies that do not exist in the threshold signal in a normal mode of operation;
- a temporal feature, say, an effect occurring temporarily in the threshold signal (at some moments of time);
- a statistical feature, say, effects averaged over a long term behavior of the threshold signal;
- a feature constituting a specified noise which is accumulated in the optical signal and expressed in the threshold signal differently in different scenarios.
- any combination of any of the above features.

For creating such a data base, some preliminary off-line investigation of the network should be performed. For typical scenarios in the network (fault scenario in one or more optical channels; non-linearity scenario in on or more channels, etc.), threshold adaptation behavior can be checked, specific characteristic features of the behavior can be found/derived and then registered in the data base as said typical features, in association with a particular typical scenario. Of course, the data base can be fulfilled after the system started its operation; a so-called training mode may be initiated and provided even on-line, for sampling the signal of interest and storing some new typical samples.

According to an alternative version, the method may then comprise, at the monitoring step,
a) a sub-step of sampling the function (i.e., the time diagram) of the threshold voltage (power) to extract therefrom one or more characteristic features and then
b) a sub-step of comparing the extracted characteristic feature with the mentioned typical features stored in the data base.

The step of comparison the extracted feature with the typical features may be performed in a number of various ways, for example by using a learning machine such as a Neural network, or another Artificial means giving the desired discrimination and classification of the typical and the extracted features.

In practice, the Inventors have revealed that some typical features may be as follows:
- a specific behavior (reflected in the time diagram) manifesting loss of signal in a specific channel; the event of signal loss might be not detected by other means since it is usually corrected by FEC (forward error correction mechanism).
- a specific behavior indicating degradation/fading/problems in the optical signal incoming a comparator and being compared to a threshold value;
- a specific behavior indicating dispersion in the optical line carrying the optical signal;
- other specific features, for example indicating PMD (polarization mode dispersion), non-linearity (NL), etc.

Exemplary time diagrams will be shown and discussed further in the description.

It goes without saying, that the method may comprise a combination of the above-mentioned versions, both from the point of forming the data base and from the point of comparison of the stored items with the monitored items.

The data base of obtained samples and the data base of typical features may form an integral data base of the proposed system for implementing the method.

Upon forming the data base of typical samples of threshold behavior, judgment and management can be performed based on monitoring one or more points in the network (say, a number of channels, and/or a number of network elements, etc.) where the threshold adaptation/changes are expected to be observed.

It should be noted that the method may be performed at a number of receivers of signals carried using respective optical channels (wavelengths), for example via a common optical communication line. The sampling of threshold signal can be performed at all the receivers, then the resulting samples and/or the resulting decisions can be correlated. In case the sampling manifests a specific problem occurring only at a specific channel, the problem may be considered a client-related problem. However, when similar problems are detected in two or more (and even for all) channels of the communication line, there exists the high probability of a specific common problem, for example—in said line.

According to a second aspect of the invention there is further proposed a system capable of implementing the inventive method. The system will be described in more details as the description proceeds. The system of the invention may be located at any network NE, especially at those comprising a receiver Rx, and is preferably intended to operate per optical channel. The implementation options comprise at least a pure centralized version, where the obtained samples are sent to the central management unit and processed there for further decisions, and a pure local version where the function of identifying the obtained samples as well the function of making further decisions are performed at the network element. Of course, various combinations of the pure implementation options are possible.

According to a further aspect of the invention, there is also proposed a software product comprising data and/or computer implementable instructions stored on a suitable computer readable storage medium and adapted, when being run on a computer/controller/monitoring and/or management system, to support and enable performing operations of the proposed method.

BRIEF DESCRIPTION OF THE DRAWINGS

The above invention will be further described and illustrated with the aid of the following non-limiting drawings in which.

DETAILED DESCRIPTION OF THE PREFERRED EMBODIMENTS

Figure 1:
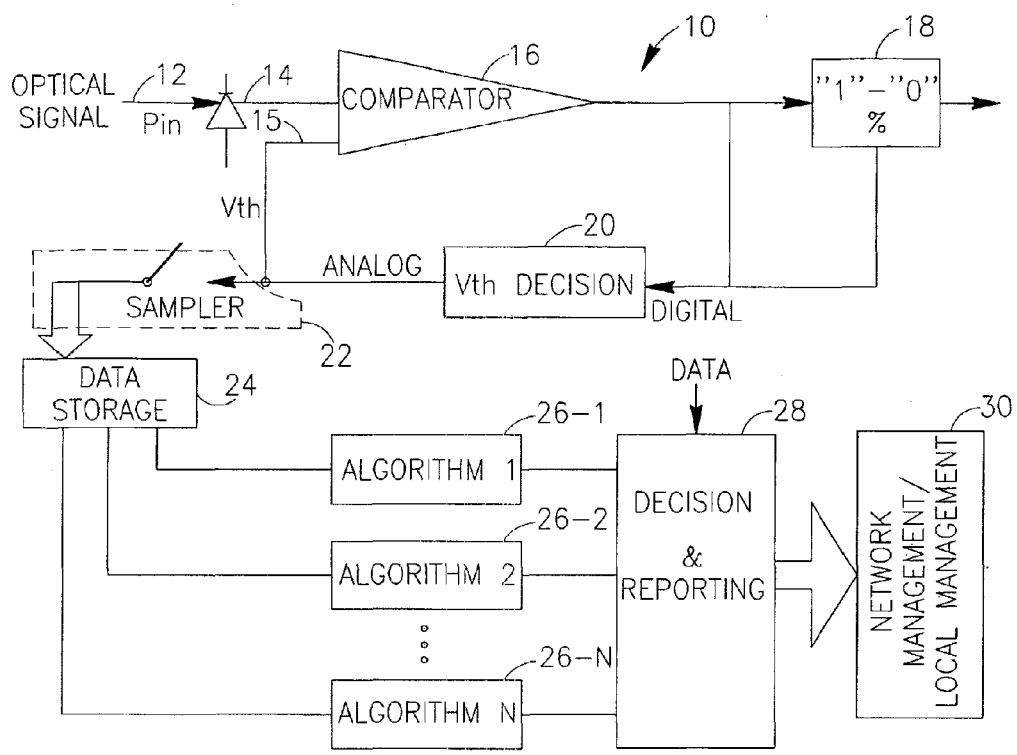
FIG. 1 is a schematic block-diagram of a system implementing one version of the method according to the invention, for a case of a binary incoming signal.

FIG. 1 illustrates a generalized block diagram of an exemplary system 10 intended for monitoring and possible management of a network section carrying—in this example—a binary optical signal. The management can be based on monitoring of a threshold value (values in case of an M-ary signal) used for discriminating a digital optical signal of a specific optical channel in a communication fiber optic line (the signal of the channel in the line is schematically marked 12). The received optical signal causes to an optical diode 14 to produce a corresponding analog electrical signal which is fed to one input of a comparator scheme 16, in order to discriminate logical "1"-s and logical "0"-s in the electrical signal, in case of a binary signal. (In the M-ary case, the comparator should be capable of discriminating several levels of the incoming signal.) The description is further continued for the binary case, without limiting generality of the solution.

A threshold value (say, expressed in voltage) $V_{TH}$ is marked 15; it is fed to the second input of the comparator 16 for discrimination of the electrical signal received at to the first input. (In case of an M-ary optical signal, the comparator 16 is a so-called level comparator.) In any case, output of the comparator 16 issues a resulting digital electric signal. It is known to those skilled in the art that a non-distorted digital binary signal comprises close to 50% of "1"-s and close to 50% of "0"-s, depending on specific conditions. In our example, block 18 (for example, FEC Forward Error Correction block) checks percentage of the two different digital levels in the resulting binary electric signal, to detect and correct errors in the signal. In case the percentage deviates from the normal one, block 18 issues a command to block 20 responsible for making decisions concerning a value of the $V_{TH}$. In case the threshold adaptation is required according to the command of block 18 and an internal algorithm of the block 20, the last issues a new analog level of $V_{TH}$ 15 which is fed to the comparator 16. The Inventors propose connecting a monitor (for example in the form of a sampler block 22) to the point between the output of block 20 and the input 15 of Comparator 16, in order to monitor the $V_{TH}$ changing values. In the implementation illustrated in FIG. 1, the sampler block 22 comprises an electrical switch with a sampling rate such as to allow obtaining samples of the changing behavior of the threshold value (of $V_{TH}$, in this example).

The samples (which can be obtained continuously, periodically, from time to time) can be fed to a data base 24 and then, using one or more processing algorithms (schematically shown as algorithmic blocks 26-1, 26-2, . . . 26-N), a decision about the nature of the monitored sample can be made in block 28 (Decision & Reporting block). The block 28 may be provided with additional input data from outside, for example data about the range of dispersion compensation in the line, BER, OSNR, link parameters.

FIG. 1 shows an exemplary arrangement for one optical channel only; however, similar samplers can be provided at each comparator responsible for discriminating signals of other optical channels in the communication line. The algorithmic blocks 26 and the D&R block 28 may be common for a number of optical channels of the same line, and may enable correlating the samples obtained, as described above, at different channels. Based on such a correlation, decisions about the source of a specific problem may be obtained at the block 28. For example, if the threshold of many comparators overcomes similar adaptation simultaneously, it may serve an indication of a common problem in the communication line.

Depending on the decision, it may be reported to a management block 30 (which may be centralized, local or combined), for accumulating data about the communication line/network and for possible further decisions and/or management actions.

Figure 2:
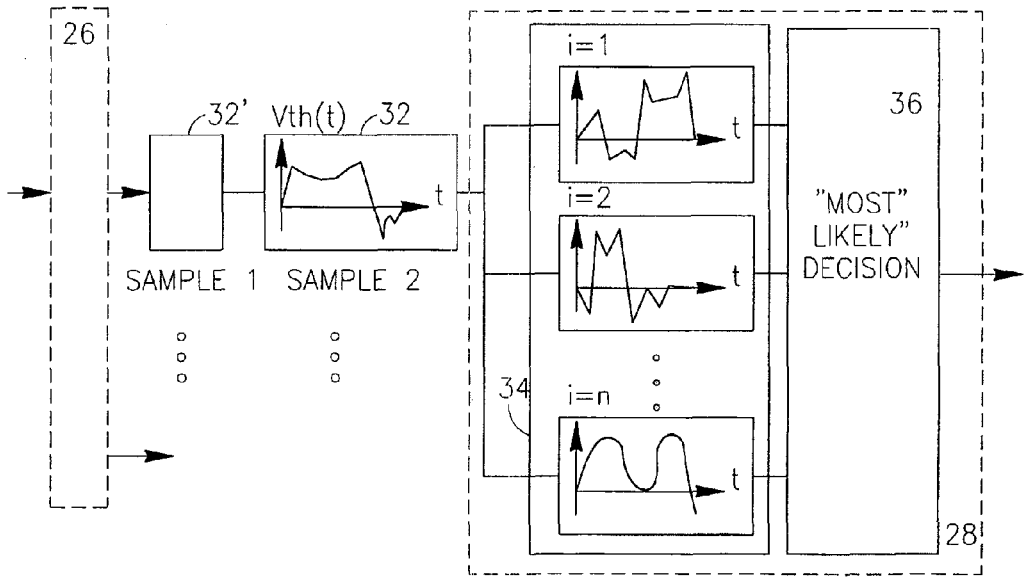
FIG. 2 is a schematic block diagram of one possible implementation of the internal decision block of the system shown in FIG. 1.

FIG. 2 schematically illustrates one possible method of making decisions in the block 28. A currently obtained sample (marked 32) of the $V_{TH}$ behavior, say after being processed by at least one of the algorithms (26, FIG. 1) is compared with a number of instances (i=1, i=2, . . . i=n), all stored in the internal memory 34 of block 28 as typical/characteristic behavior samples.

It should be noted that such typical/characteristic samples are stored in advance, and each is intended to serve as a typical reference (pattern) reflecting a specific event, a problem/fault of the communication line/signal/environment, etc. Various kinds of events or behavior of the communication line/signal/environment/may be simulated in advance and thus the typical samples of the $V_{TH}$ shape can be obtained and stored. Typical features (mentioned above) may also be stored in the block 34.

For example, i=1 can be the behavior of the $V_{TH}$ (shape of that curve) upon adding a wavelength to the communication line, or upon dropping a wavelength. Then i=2 may be the $V_{TH}$ behavior due to the increase/decrease of power of the input signal ($P_{in}$, FIG. 1); etc.

However, some new current samples may be considered as typical samples and stored in the memory 34; conditions and mechanisms for that are not described in the frame of this application. Self learning in order to add new typical samples to the memory 34 can be performed, for example, during off-line or even on-line training of the system. The on-line training mode means that, without affecting the data traffic, the system may allow storing new samples as typical samples. Such a mode may be initiated by an operator, for example when some specific characteristic conditions exist in the line, or when such conditions are somehow simulated.

The comparison of current sample(s) with the typical samples may be performed according to a number of various options. For example:

Option 1.

A sequence of current samples stored in the block 24 (FIG. 1) are subjected to a shape correlation based operation (say, Algorithm 1) with reference to the typical samples stored in the block 34.

Upon the comparison of sample 32 with samples/instances stored in the memory 34, block 36 may select the "most likely" typical behavior sample out of these instances, thereby identifying the current sample 32 as indicating some specific event/scenario in the communication line/signal/environment, etc.

Option 2.

Alternatively or in addition, the memory 34 may be used for storing typical spectral and/or temporal and/or statistical and/or noise features of the typical samples (obtained by Fourier transform, other types of transforms, etc).

The typical features form their own data base; they, for example, may be:
  a) spectral, such as specific frequencies that do not exist/or almost do not exist in a normal mode of operation;
  b) statistical, like averaged over time moments of behavior of the $V_{TH}$ signal, or high order statistics;
  c) noise-based, i.e. types of noise which is accumulated in the network portion and affect the threshold signal behavior.

When the data base of typical features is already formed, a sequence of current samples of the $V_{TH}$ 32, 32' . . . are processed to extract there-from one or more relevant features; the extracted features are then compared to those stored in the data base of typical features.

The comparison may be implemented using any learning machine (say, a Neural network) enabling sufficient discrimination and classification of the described characteristic features.

Option 3.

Any combination of Option 1 and Option 2 may be utilized.

Figure 3:
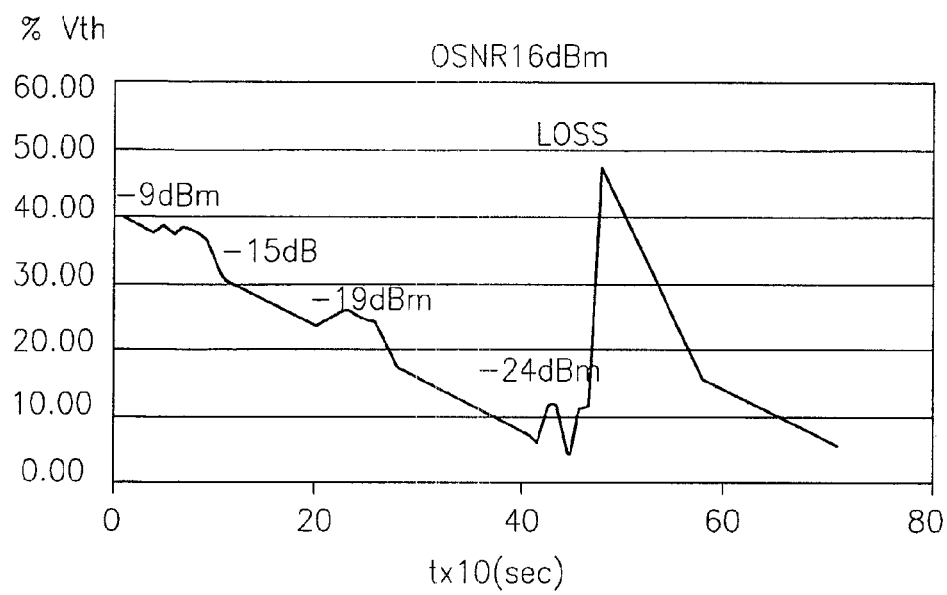
FIG. 3 is an exemplary, experimentally obtained time diagram illustrating one possible typical feature of behavior of the threshold signal (amplitude) under monitoring.

FIG. 3 illustrates an experimentally obtained example of the $V_{th}$ behavior where the system (a specific optical channel in the communication line) suffers gradual power degradation/fading of the input signal and then an artificially created signal loss event. The experiment is performed for a binary input signal. The degradation of the input signal is indicated by steps of −9 dBm, −15 dBm, −20 dBm, −24 dBm of the $P_{in}$ (or $V_{in}$) of the signal received at the input of the photo diode 14 (FIG. 1).

The graph is built for the constant value of OSNR=16 dB, and for the case of fully compensated dispersion in the communication line for the optical channel of interest. Usually, the level of dispersion compensation is known in advance for each optical channel in the communication line. The vertical axis indicates the level, in %, of the $V_{th}$ value which is normally located around 40% to correctly discriminate between levels of the logical "1" and "0" of the binary signal being checked in this example. The graph illustrates changes of the $V_{th}$ value, while the $V_{th}$ is being adapted due to the mentioned gradual degradation of the input signal. The "loss" event happens at the time approx. at the moment of 450 s, and is seen as a peak of the graph. In our example, the algorithm of block 20 (FIG. 1) returns the $V_{th}$ to its initial value in case of the signal loss.

It should be noted that the problems/events which find their reflection in the specific shape of the $V_{th}$ value curve, happen in a real system but may not lead to any degradations in the system performance since a FEC-like mechanism usually corrects errors caused by such problems/events. However, the idea of the proposed method allows registering the problems and event in the system which otherwise remain unnoticed and may later result in serious degradations of the system performance. As can be seen on the graph, our adaptive threshold method has "filtered" (detected) the problematic degradation of the signal and the signal loss event. Without the proposed method, no one would know about the problems and no one would be able to come to any conclusions based on it.

It is therefore the main idea of the invention to provide the management information about events in the network, by monitoring/sampling the ($V_{TH}$) versus (Time) and analyzing it.

Figure 4:
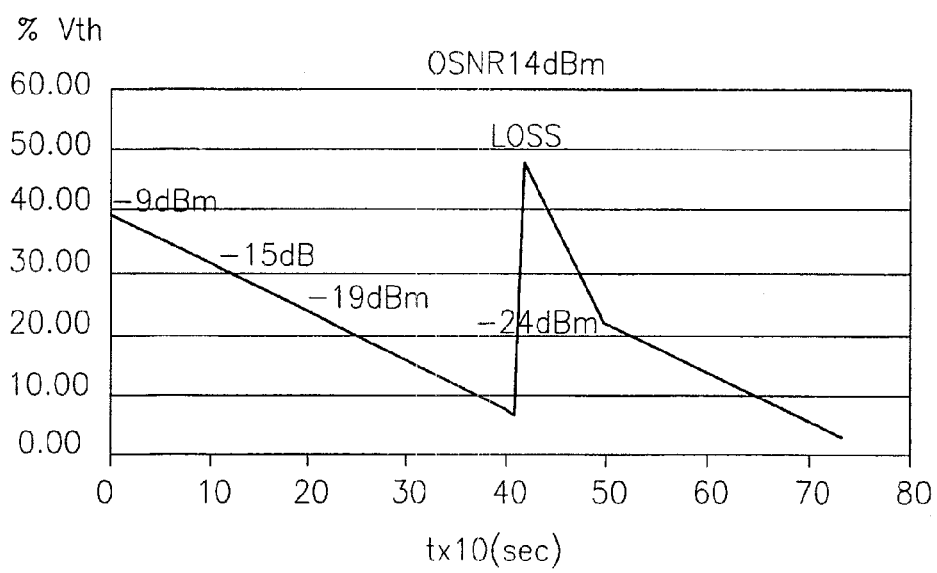
FIG. 4 is another experimentally obtained typical feature of behavior of the threshold amplitude under monitoring of an optical communication channel.

FIG. 4 illustrates a slightly changed graph of the threshold value behavior, at the same fully compensated communication line but at the constant OSNR value=14 dBm, i.e., when signal to noise ratio (quality) of the input signal is lower than that in FIG. 3. The input signal is also the binary signal, for the sake of simplicity only. The invention can be successfully applied to the case of M-ary input signal, too. One may notice that the graph of FIG. 4 does not comprise characteristic fluctuations which are seen in FIG. 3, but its general shape is preserved. These facts speak for robustness of the proposed criterion for detecting of specific degradation in the input signal and of the signal loss. Also, the facts speak for a possibility to estimate the signal's OSNR, without directly measuring it.

Figure 5:
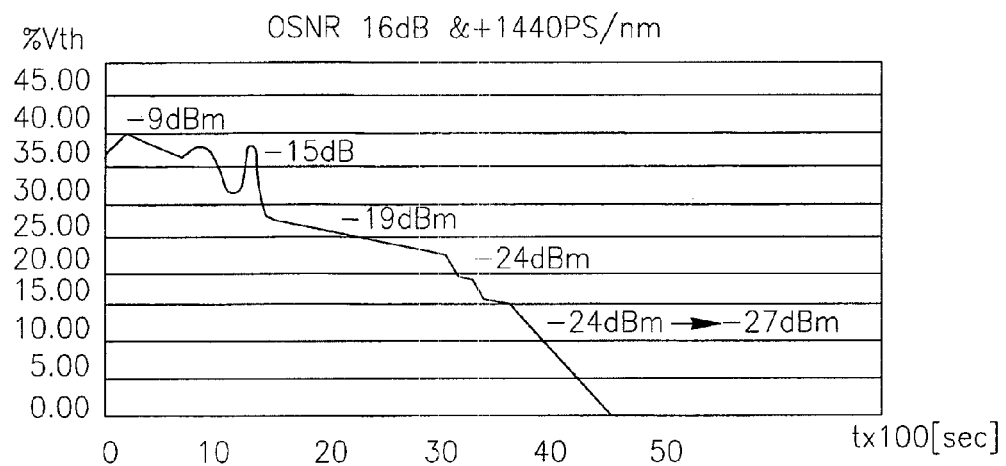
FIG. 5 is yet another experimentally obtained typical feature of behavior of the threshold amplitude under monitoring of a communication line.

FIG. 5 shows an experimental graph where the horizontal axis (t) is in values being one order greater than those used in FIGS. 3 and 4. The process of changing/adapting the threshold value due to degradation of the input signal is much lengthier in FIG. 5, than in FIGS. 3 and 4. It is just due to the operator-initiated changes of the input signal (a binary one in this example).

FIG. 5 illustrates events in a system where 80 km of the communication line are not compensated from the point of chromatic dispersion. One may understand that various conditions of the communication line, say from the point of dispersion compensation, give various typical shapes of the threshold value behavior, which may further be used as references for conclusions about the condition of the communication line.

Figure 6:
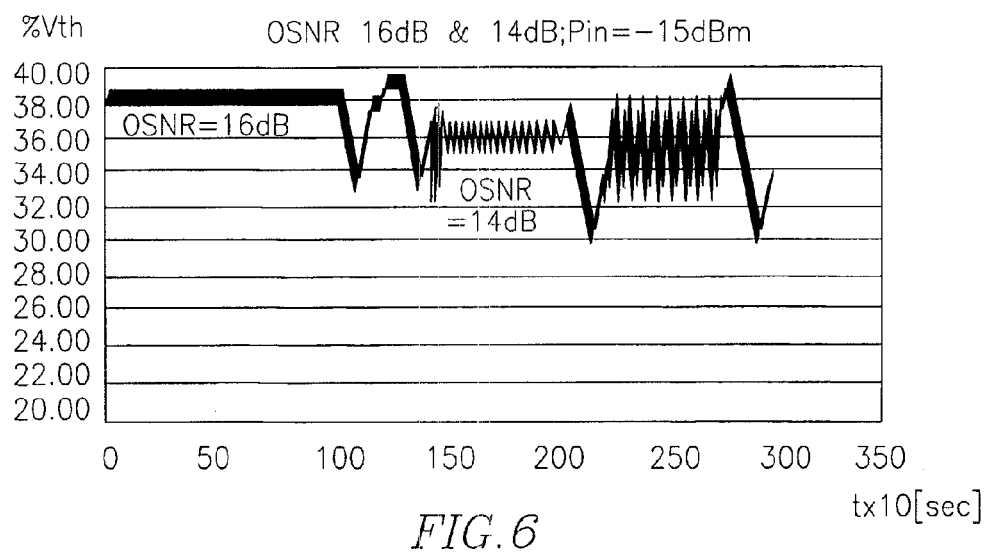
FIG. 6 is an additional typical feature of behavior of the threshold amplitude, obtained for other conditions of the communication line.

FIG. 6 illustrates an experimental graph showing what happens with the $V_{TH}$ when OSNR value of the optical signal degrades while the input signal power is maintained constant and the dispersion in the line is fully compensated.

The graph generally has a ladder shape, with transition processes between its different steps. OSNR may degrade owing to a number of reasons, but may remain unnoticed till a real crash of the system.

For example, OSNR may descend due to noise, non-linearity of the system, filtering problems, cross-talk, end of life or drift of the optical laser, etc. Our invention will allow timely noticing OSNR degradation if a typical shape(s) similar to that of FIG. 6 is timely introduced in the data base of typical samples, and if then suspicious similar samples are timely detected in the threshold signal. That will allow timely allocating a real reason of the OSNR degradation. The threshold signal's level 0.38 corresponds to the OSNR 16 dB, while the level 0.36 corresponds to the OSNR value of 14 dB. Fluctuations of the graph may result from specific implementation of the circuit 20. However, specific fluctuations may also serve for diagnostics of the system's operation, for predicting and preventing the approaching degradation or collapse of the system.

It should be appreciated that other versions of the method and different implementations of the system implementing the method may be proposed, and that they should be considered part of the invention whenever defined by the general claims which follow.

The invention claimed is:

1. A method for managing at least a network portion of an optical communication network, the method comprising:
   obtaining, at different times, threshold samples for discriminating a digital optical signal being propagated via said at least a network portion of the optical communication network;
   determining changes occurring in decision thresholds based on the obtained threshold samples, and deriving therefrom a temporal decision threshold behavior at said at least a network portion of the optical communication network;
   comparing the derived temporal decision threshold behavior with previously stored reference decision threshold behaviors to identify an event associated with a potential problem in said at least a network portion of the optical communication network; and
   providing management information based on the identified event.

2. A method according to claim 1, wherein the potential problem is associated with a specific channel operative at said at least a network portion of the optical communication network.

3. The method according to claim 1, further comprising a step of affecting a change in the at least a network portion of the optical communication network based on the provided management information and monitoring a behavior of the at least a network portion of the optical communication network after said change has been affected.

4. The method according to claim 1, further comprising a preliminary step of forming a data base for storing the reference decision threshold behaviors, each reference decision threshold behavior being associated with a different behavior of one of the decision thresholds.

5. The method according to claim 4, wherein each of said stored reference decision threshold behavior represents a unique operating condition of said at least a network portion of the optical communication network.

6. The method according to claim 4, wherein at least one of the reference decision threshold behaviors comprises one or more of the following: a typical shape of a time diagram, a spectral feature, a temporal feature, a statistical feature, and a noise-related feature.

7. The method according to claim 4, wherein each of said reference decision threshold behaviors is associated with at least one of the following: a specific behavior manifesting a loss of said optical signal in a specific optical channel; a specific behavior indicating degradation problems in said specific optical signal of the specific optical channel; a specific behavior indicating dispersion in an optical line carrying said optical signal; another specific behavior indicating polarization mode dispersion; and non-linearity in the optical line carrying said optical signal.

8. The method according to claim 1, further comprising identifying typical scenarios in said at least a network portion of the optical communication network, and identifying a decision threshold behavior associated with each of said typical scenarios.

9. The method according to claim 1, wherein the optical signal is a binary signal.

10. A system for managing an optical communication network by monitoring at least a network portion of the optical communication network, the system comprising:

a sampler for obtaining threshold samples, at different times, for discriminating a digital optical signal being propagated via said at least a network portion of the optical communication network; and at least one processing device configured to:

determine changes occurring in decision thresholds based on the obtained threshold samples, and to derive therefrom a temporal decision threshold behavior at said at least a network portion of the optical communication network;

compare the obtained temporal decision threshold behavior with previously stored reference decision threshold behaviors, and identify an event associated with a potential problem in said at least a network portion of the optical communication network; and provide management information based on the identified event.

11. The system according to claim 10, wherein the potential problem is associated with a specific channel operative at said at least a network portion of the optical communication network.

12. A software product comprising computer implementable instructions and/or data for carrying out the method according to claim 1, and stored on a non-transitory computer readable storage medium, wherein that the software is capable of enabling operations of said method when used in a computer system.

* * * * *